United States Patent Office 3,799,785
Patented Mar. 26, 1974

3,799,785
COLORED CEMENT
Theodore F. Tanner, Richardson, Tex., assignor to
General Portland Cement Co., Dallas, Tex.
No Drawing. Continuation-in-part of application Ser. No.
51,361, June 30, 1970, now Patent No. 3,667,976, dated
June 6, 1972. This application Aug. 19, 1971, Ser. No.
173,256
The portion of the term of the patent subsequent to
June 6, 1989, has been disclaimed
Int. Cl. C04b 7/10
U.S. Cl. 106—101          10 Claims

ABSTRACT OF THE DISCLOSURE

An improved portland cement is provided by burning a mixture of argillaceous and calcareous materials with a color-enhancing amount of metal oxide in a burning zone of a kiln and thereafter rapidly quenching the resulting clinker from a temperature above about 2600° F. to effect a very rapid cooling thereof. It is generally preferred that the clinker be quenched from a temperature of between 2650° F. to 2850° F. at a very rapid rate such as in a water quench zone.

BACKGROUND OF THE INVENTION

This application is a continuation-in-part of copending patent application Ser. No. 51,361 filed June 30, 1970 now U.S. Pat. 3,667,976.

Prior attempts have been made to produce colored cements. These cements are and have been useful in various applications in which an aesthetic effect is desired in the final concrete product made from the cement. The final product has been colored at the site at which the concrete is produced. This procedure, however, usually involves large quantities of pigments which can undesirably affect the final properties of the concrete product. Another attempt which has been made to color cement is to grind various pigmentations with clinker as it is ground. This latter method also requires a significant amount of pigment or additive. Additionally, it does not consistently produce a good colored cement product. The latter method also results in a mere additive color, which can be bleached or eroded upon exposure, rather than one brought about by chemical interaction with the cement constituents.

For example, U.S. Pat. 1,958,615 discloses a method for making colored cement by which clinker or ground cement is combined with a small quantity of sulfur and heated to about 800 to 1600° F. and maintained at that temperature for several hours out of contact with oxygen. Varying colors can be obtained by heating at preselected temperatures within the range for varying lengths of time. As is evident, however, this method requires an extra processing step and an extra heating step, both of which take time and consume additional energy. U.S. Pat. 3,068,109 discloses another method for making colored cement, especially portland cement, by mixing with a cement-sand aggregate-water mixture a pozzolanic material which has been premixed with relatively small quantities of suitable mineral pigments. The pozzolanic material and mineral pigments are mixed with portland cement in ratios of 1:3 to 1:12, respectively. Here again, the average proportion of pigmentation to cement is quite high and can affect the hydraulic properties of the cement when intermixed with the final concrete composition.

Still another method for producing colored cements is disclosed in U.S. Pat. 1,829,082. This patent discloses mixing substances such as phosphates, borates or halogen compounds as a flux with the raw materials for making cement and further adding to the raw materials a metal compound such as the oxides of chromium, nickel, cobalt and copper. Specific examples are given. This disclosure states that metal complexes including borosilicates and metal sodium phosphates, for examples, produce the color tendency in the final cement product.

Recently a technique has been discovered for producing a novel colored cement by burning raw cement materials in the presence of a color-enhancing amount of metal oxide. This technique is disclosed in my copending application Ser. No. 51,361 filed June 30, 1970, of which this present application is a continuation-in-part. The product produced by this new technique is a cement product which has a specific, durable color.

SUMMARY OF THE INVENTION

According to the present invention, an improved method is provided for producing a colored cement which comprises initially burning argillaceous and calcareous materials with a sufficient amount of a metal oxide coloring agent in the burning zone of the kiln to produce a burned cement clinker and thereafter maintaining the cement clinker at a temperature above about 2600° F. prior to rapidly quenching the same. Preferably, the material passing from the burning zone in the kiln is heated by an auxiliary burner adjacent the outlet thereof to maintain the material at a temperature above about 2600° F. as it is passed to a quenching zone. Preferably, the material is rapidly quenched with water.

DESCRIPTION OF PREFERRED EMBODIMENTS

In the typical cement making process, particularly a portland cement manufacturing process, ground argillaceous materials, calcareous materials and other minor proportion reactants are mixed and fed to an elongated rotary kiln, or other reaction system including a vertical kiln or a fluid bed-type reactor or kiln. The ground argillaceous and calcareous materials are burned at temperatures ranging typically between 2600° F. and 2800° F. A chemical reaction takes place in the kiln between the argillaceous, calcareous and other retactants to produce a cement clinker primarily composed of tetracalciumaluminoferrate, tricalciumaluminate, tricalciumsilicate, and dicalciumsilicate. These products form what is called a cement clinker, which after cooling to ambient temperatures, is very finely ground with calcium sulfate to produce what is known as portland cement. The calcium sulfate is conventionally incorporated with the ground clinker to control setting time. The argillaceous materials are typically a clay or a clay-kaolin mixture. The calcareous materials are usually the calcite found in limestone. Additionally, other materials such iron ore, slag or other additives are ground and mixed with the raw materials fed into the kiln.

As set forth in said copending application Ser. No. 51,361, it has been discovered that the addition of certain metals or metal compounds to the raw materials for the production of cement will produce a cement of predictable and desirable color and hue. It is to be understood that when the term metal or metal compound is used hereinafter that the metal can be in the elemental state, or can be in combined form such as an oxide or a mineral complex, or can be in ionic form. Generally, the metals can be added to the raw materials in amounts (expressed as the metal oxide) from about 0.2%, preferably about 0.3% to about 2.0% and most preferably from about 0.4% to about 0.7% based on the total dry raw materials introduced into the kiln. It is to be understood that these ranges include amounts of metal naturally occurring in the cement raw materials as well as additional amounts mixed with the raw materials in accord with this invention. Going beyond the preferred limits, for example, below the lower limit of 0.2, will produce a cement which had a significant natural gray tone, but still slightly colored. Going above the upper limit of about 5% will produce a cement having the color characteristics of the particular metal added, however, the color additive will begin to affect the hydraulic properties of the cement. In addition, the color and hue and tone will begin to become somewhat muddy, i.e., it will begin to have an undesirable aesthetic quality. It is to be understood that when a percent of metal is utilized herein, it is expressed as a percentage by weight of the metal oxide, e.g., $TiO_2$, $ZrO_2$, $Mn_2O_3$ and $V_2O_5$, although the metal might be added in elemental compound or mineral-complex form.

The percentage ranges expressed in the foregoing paragraph are based on total dry raw materials. These same ranges based on an analysis of cement clinker are, expressed as the oxide of the metal, from about 0.3% to about 8.0%, preferably about 0.5% to about 3.2%, and most preferably about 0.6% to about 1.0% by weight of the metal coloring agent in the final ground clinker.

The metals which have been discovered which will lend a desirable and predictable hue and color to a cement clinker are those which appear in Groups IV–B, V–B and VII–B of the Periodic Table as it appears at page B-2 of the 45th edition of the Handbook of Chemistry and Physics, Chemical Rubber Publishing Company, of Cleveland, Ohio (1964). Preferred among these metals are titanium, zirconium, manganese and vanadium. Addition of titanium to the raw materials will produce a cement clinker which has a buff color, that is, it will produce a yellowish hue in the final cement clinker. Addition of manganese to the raw materials will produce a clinker with a definite blue tone. Addition of vanadium will produce a silver-gray bordering on a green tone. Zirconium will again produce a buff colored cement clinker.

It has been found that the color and hue is somewhat dependent upon the reaction or burning temperatures. For example, when titanium is mixed with raw materials, a reaction temperature of between 2500° and 2700° F. will produce a grayish buff or grayish yellow cement clinker. However, when the reaction temperature ranges between 2600° F. and 3000° F., a definite buff tone and very desirable hue will be present. Preferred percentages of titanium to be added to the raw materials, based on the dry weight of the raw materials, ranges between 0.3% by weight (expressed as titanium dioxide) to about 2.0% by weight. The most preferred burning zone temperatures or reaction temperatures range between about 2650° F. to 3000° F.

Additionally, it has been found that quenching the clinker produced by adding the metals set forth above will additionally fix and produce a brighter hue of the same tone as is produced by merely adding the metal alone. Quenching can be accomplished by an air blast upon the hot clinker as it leaves the kiln, or can be accomplished by other quenching media such as steam or water. Normally, clinker will cool to ambient temperature in about 10 to more than 20 minutes. If the clinker is quenched from its burning temperature of around 2700° F. to near room temperature in about half that time, that is, from 5 to 12 or so minutes, the clinker will take on a very definite bright, aesthetically desirable hue and color characteristic of the metal which has been added to the raw materials. As a general guideline, the desirable quality contributed by quenching will occur if the clinker is cooled about 1.5 or more times faster than occurs in conventional production. Generally, quenching in a time span of about 25% to 75% of that which the clinker normally takes to cool to room temperature will produce the desirable increase in hue and color fixation.

More specifically, and in accordance with this invention, it has been found that in order to effectively fix and produce a brighter hue of the same tone as is produced by merely adding the coloring agent alone, the clinker from the burning zone of the kiln should be maintained at a "prequench" temperature above about 2600° F. at the time that the quenching operation begins. Thereafter, quenching is preferably accomplished by the methods as set forth above, and generally in the same span as set forth above. It is preferred that this "prequench" temperature be maintained at a point substantially above about 2600° F., e.g., up to about 3000° F. Considering product quality as well as economic and engineering factors, the preferred prequench temperature is in the range of 2650° to 2850° F.

This prequench temperature can be maintained in any convenient manner. It is only necessary that the clinker passing from the burning zone of the kiln be maintained above about 2600° F. at the time that the rapid quenching process begins. It has been found, for example, that when using conventional rotary kilns for producing Type I cements that the clinker has a tendency to cool to a temperature below about 2600° F. before it is quenched. As a result, it has been very difficult to produce cements of some of the more desirable, brighter hues. Thus, it has been found that the positioning of an auxiliary burner adjacent the outlet of such kilns will satisfactorily maintain the clinker from the burning zone at a temperature well above 2600° F. Subsequent rapid quenching as described above, will satisfactorily produce cement of the brighter hues.

It is not completely understood why a temperature of about 2600° F. or higher of the clinker entering the rapid quenching zone is necessary to produce cements having improved colors which are very bright and intense. It is believed that the components of the cement clinker are basically in a solid solution state at temperatures above 2600° F. and they begin their normal process of crystallization at about 2600° F. Therefore, one theory is that a rapid quenching of the clinker while it is maintained in the general state of solid solution, results in rapid crystallization of the materials directly from the solid solution state to yield a resulting crystalline structure having a color which is brighter and more intense than that obtained by quenching from a lower temperature.

EXAMPLES

The following examples are presented as guidelines for those of ordinary skill in the art to reproduce the present invention. Included among the examples are preferred embodiments of the invention. These examples are intended as exemplifications only and are not intended to be delimitative of the invention in any manner. All percentages used therein are by weight unless otherwise stated. All formulations in the following examples are intended to produce a "Type I" general purpose portland cement which has the color, tone and hue characteristic of the metal which has been added, although the coloring mechanism will be equally effective with other cement formulations.

Example I

A cement raw material mix of the following chemical composition is prepared using a mixture of limestone, clay and iron ore.

TABLE I

Basic raw mix for Example I

| Composition: | Percent by weight |
|---|---|
| $SiO_2$ | 14.0 |
| $Al_2O_3$ | 3.6 |
| $Fe_2O_3$ | 1.7 |
| CaO | 41.2 |
| Loss on ignition | 37.0 |

The foregoing mixture is altered by varying the addition of limestone and ilmenite. (Ilmenite is a mineral complex of the formula $TiO_2 \cdot FeO$. The ilmenite utilized in this particular example is obtained from Australia in a reprocessed ore form containing about 50% $TiO_2$ by weight. The ore can be purchased as ilmenite concentrates from Frank Samuels and Company, King of Prussia, Pa.) In this way 1,000 grams of seven different raw mixes are prepared. They are set forth in Table II.

TABLE II.—RAW MIXES WITH Ti VARIED

| | Samples (weight percent) | | | | | | |
|---|---|---|---|---|---|---|---|
| | 1 | 2 | 3 | 4 | 5 | 6 | 7 |
| Composition: | | | | | | | |
| $SiO_2$ | 14.0 | 14.0 | 14.0 | 13.9 | 13.8 | 14.0 | 13.7 |
| $Al_2O_3$ | 3.6 | 3.6 | 3.6 | 3.6 | 3.6 | 3.5 | 3.5 |
| $Fe_2O_3$ | 1.7 | 1.7 | 1.7 | 1.7 | 1.7 | 1.7 | 1.7 |
| CaO | 41.2 | 41.2 | 41.1 | 41.0 | 41.4 | 41.0 | 41.1 |
| Loss on Ignition | 37.0 | 37.0 | 37.0 | 36.5 | 36.7 | 37.1 | 37.0 |
| Composition: $TiO_2$ | 0.0 | 0.1 | 0.5 | 0.75 | 1.0 | 2.0 | 3.0 |

About 100 grams of each of the raw mixes is pellitized. 20 gram portions from each of these 100 gram samples are separately burned in an electric furnace for 20 minutes at temperatures varying from 2500° F. to 3000° F. After burning for 20 minutes, the samples are removed at once from the furnace and allowed to cool by normal radiation and convection to room temperature. The samples are ground with mortar and pestle and visually compared for color. The results are set forth in Table III, using the following color code: G, gray; GY, gray with yellow trace; B, good buff hue; B/M, buff tone which is slightly muddy.

TABLE III.—COLOR RESULTS FROM EXAMPLE I

| | Sample number | | | | | | |
|---|---|---|---|---|---|---|---|
| Temperature, °F. | 1 | 2 | 3 | 4 | 5 | 6 | 7 |
| 2,500 | G | GY | GY | GY | GY | GY | GY |
| 2,600 | G | GY | GY | GY | GY | GY | GY |
| 2,700 | G | GY | B | B | B | B/M | B/M |
| 2,750 | G | GY | B | B | B | B/M | B/M |
| 2,800 | G | GY | B | B | B | B/M | B/M |
| 2,900 | G | GY | B | B | B | B/M | B/M |
| 3,000 | G | GY | B | B | B | B/M | B/M |

The procedure of Example I is repeated using rutile and purified titanium dioxide, rather than ilmenite. The results are substantially the same.

Example II

A cement raw mix weighing 175 pounds was prepared using a mixture of limestone, clay, iron ore and ilmenite ore. The chemical composition of the cement raw mix is set forth in Table IV.

TABLE IV

Cement raw mix for Example II

| Composition: | Percent by weight |
|---|---|
| $SiO_2$ | 13.4 |
| $Al_2O_3$ | 3.7 |
| $Fe_2O_3$ | 2.2 |
| CaO | 42.3 |
| MgO | 1.4 |
| Loss on ignition | 35.2 |
| $TiO_2$ | 1.2 |

The raw mix is pellitized and burned in a 5" x 14" x 10' long laboratory rotary kiln. Samples of the clinker are taken and visually checked for color. The color is recorded at 30 minute intervals. In addition, the temperature of the kiln burning zone is taken and recorded at one hour intervals. The run was continued for about 7 hours. The results are set forth in Table V.

TABLE V.—COLOR RESULTS OF EXAMPLE II

| | Clinker | | |
|---|---|---|---|
| Hour | Production rate, lb./hr. | Temperature leaving burning zone, °F. | Color |
| 1 | | 2,700 | Buff. |
| 2 | 4.60 | 2,630 | Do. |
| 3 | 6.44 | 2,590 | Yellow-gray. |
| 4 | 4.27 | 2,640 | Buff. |
| 5 | 4.60 | 2,640 | Do. |
| 6 | 5.10 | 2,645 | Do. |
| 7 | 4.84 | 2,620 | Do. |

As can be seen from the foregoing data, when the burning temperature reaches a point below 2600° F., the clinker retains some of its natural gray tone. When the temperature is above 2600° F., a good quality buff clinker is produced.

Example III

Approximately 100 grams of cement raw mix is prepared using a mixture of limestone, clay and iron ore. Three 20 gram samples are taken of this cement raw mix. To the first sample is added a manganese salt, to the second sample is added vanadium salt and to the third sample is added zirconium salt. The chemical composition of the three cement raw mixes is set forth in Table VI.

TABLE VI.—RAW MIX ANALYSES, EXAMPLE III

| | Sample (weight percent) | | |
|---|---|---|---|
| | 1 | 2 | 3 |
| Composition: | | | |
| $SiO_2$ | 13.3 | 13.3 | 13.3 |
| $Al_2O_3$ | 3.7 | 3.7 | 3.7 |
| $Fe_2O_3$ | 2.2 | 2.2 | 2.2 |
| CaO | 41.7 | 41.7 | 41.7 |
| MgO | 1.5 | 1.5 | 1.5 |
| Ignition loss | 36.4 | 36.4 | 36.4 |
| Composition: | | | |
| $V_2O_5$ | | 2.0 | |
| $Mn_2O_3$ | 2.0 | | |
| $ZrO_2$ | | | 2.0 |

Each of the three samples are pelletized and burned in an electric furnace for about 20 minutes at 2750° F. Immediately after the burn, the clinker samples thus formed are removed from the furnace and allowed to cool by natural convection and radiation to room temperature. The clinker is then ground with a mortar and pestle. The sample 1 to which manganese is added has a definite blue tone. The sample to which vanadium is added has a silver-gray to green tone. The sample to which zirconium is added has a definite buff color comparable to that obtained above with titanium.

Example IV

A procedure similar to that of Example I is repeated varying the equivalent percent of titanium added to a cement raw mix for production of a Type I portland cement. Two samples are burned at 2750° F. for about 20 minutes in an electric furnace after which they are removed and allowed to naturally cool to room temperature. Each of the two samples containing the titanium metal produced a buff color and hue. The first sample contained 0.1% titanium dioxide. The second sample contained 5.0% titanium dioxide.

Example V

Five samples of a cement raw mix weighing about 100 pounds are prepared using a mixture of limestone, clay, iron ore, and ilmenite ore. The five samples are individually pelletized and burned in a 5" x 14" x 10' long laboratory rotary kiln. Immediately upon being discharged from the kiln, the clinker is quenched in water. Thereafter, the clinker is dried and ground. Clinker analyses for the five samples are set forth in Table VII.

TABLE VII.—CLINKER ANALYSIS FOR EXAMPLE V

| | Sample number (percent by weight) | | | | |
|---|---|---|---|---|---|
| | 1 | 2 | 3 | 4 | 5 |
| Composition: | | | | | |
| SiO₂ | 22.3 | 21.7 | 21.5 | 21.5 | 20.8 |
| Al₂O₃ | 5.6 | 6.0 | 5.6 | 5.5 | 5.3 |
| Fe₂O₃ | 2.6 | 2.8 | 2.7 | 2.7 | 2.7 |
| CaO | 66.0 | 66.5 | 65.7 | 66.7 | 66.5 |
| MgO | 2.6 | 2.8 | 2.5 | 2.6 | 2.6 |
| TiO₂ | 0.3 | 0.5 | 0.8 | 1.1 | 2.8 |

The color of the ground clinker with varying percentages of titanium in the clinker is set forth in Table VIII.

TABLE VIII.—COLOR OF GROUND CLINKER

| Sample No. | $TiO_2$ (percent by weight) | Color |
|---|---|---|
| 1 | 0.3 | Light gray, yellow tint. |
| 2 | 0.5 | Light yellow. |
| 3 | 0.8 | Buff, very slight red trace. |
| 4 | 1.1 | Buff. |
| 5 | 2.8 | Do. |

As is observed, the color obtained is yellowish and with $TiO_2$ content of 0.5% by weight and, above the color obtained is definitely a yellow to buff tone. The color obtained upon quenching is brighter and more intense than that obtained when the clinker is cooled to room temperature in a laboratory tray exposed to the atmosphere.

From the foregoing examples, it can be seen that the addition of metals to a raw cement mix will give a definite color to the final clinker. It can also be seen that the color is characteristic of the particular metallic element or compound which is added to the raw mix. It is to be understood that the metal, whether elemental, an oxide or a mineral complex, can be added to the kiln with the raw material feed end or to the burning zone, for example, by insufflation. The metal can also be added intermediate the feed end and the burning zone by a suitable mechanism, for example, a scoop feeder, or if desired at any point upstream of the feed end, including during initial grinding of reactant materials or into a preheating system.

The role which the metals assume to provide color in the cement composition is not completely understood. One theory is that, for example, the titanium is in some way combined with the ferrite phase of the clinker and that the aluminate/ferrite molar ratio must be greater than one in order to give the clinker a buff color. For example, if no titanium is present in the cement raw mix and the final clinker has an aluminate to ferrite ratio less than one, the color of the clinker is gray. The clinker is white if the ferrite phase is not present and if titanium is present. The color, however, returns to gray when the ferrite phase is present and the aluminate to ferrite phase is less than one. When, however, the titanium is present and the aluminate-ferrite ratio is greater than one, the color of the cement clinker becomes buff. It is, therefore, believed that the color tendency is somehow interrelated and connected with the ferrite phase. Therefore, if the aluminate to ferrite ratio is greater than one in the presence of a metal, the cement clinker will exhibit the characteristic color and hue of the particular metal.

Example VI

A Type I portland cement raw mix was prepared using a mixture of limestone, clay, iron ore and ilmenite ore. The ilmenite ore was incorporated into the mix in a ratio of three pounds per barrel (approx. 600 lbs.) raw material.

About 3500 barrels of the raw mix was burned in a conventional Type I portland cement kiln. The kiln included a 20 foot length at the outlet end thereof extending from the internal burning zone, and sixteen portholes were positioned around the periphery of the kiln at a point approximately 10 feet from the end of the burning zone. The clinker was in the burning zone for a period of from about 12 to 20 minutes and was burned at a temperature between 2700° F. and 2800° F. The clinked passing from the burning zone was discharged from the rotating kiln through the portholes and into water quench zones. The clinker was rapidly quenched from temperatures no higher than 2600° F. The resulting material, while definitely buff colored had a very muddy tone.

Next, an annular refractory brick dam was positioned about the inside periphery of the kiln, just downstream of the portholes. Furthermore, an auxiliary burner (using natural gas as a fuel) was positioned within the outlet end of the kiln so that the lower portion of its flame contacted the brick dam and the top surface of the load passing through the kiln. Again, the quench zone operatively communicated with the portholes of the kiln. The above twenty-four hour run was duplicated using the same raw materials but in the modified kiln wherein the auxiliary flame was utilized to maintain the material from the burning zone through the portholes at a temperature of about 2650° F. The material was immediately and rapidly quenched from this temperature within the water quench zone. This procedure resulted in buff colored cement having a color which was very much brighter and more intense than that obtained when the clinker was quenched in the run above.

The utility of the foregoing invention is apparent to those of ordinary skill in the art. Its utility is especially apparent to those in the business of manufacturing portland cement due to the large demand for cements of buff and other colors. Although the foregoing specification has set forth this invention in relation to preferred embodiments, other variations, alterations and equivalent formulations and compositions will be apparent to those of ordinary skill. The invention is not intended to be limited in any manner by the foregoing description except as defined by the appended claims.

What is claimed is:

1. In a method of producing a colored portland cement which includes burning in a burning zone of a kiln finely divided argillaceous and calcareous reactant materials together with from 0.2 to 5 weight percent thereof of an oxide of a metal selected from Groups IV-B, V-B and VII-B of the Periodic Table, and then rapidly quenching the clinker after it has been burned, the improvement comprising:
rapidly quenching said clinker from a temperature above about 2600° F.

2. The method of claim 1 wherein said clinker is quenched with water.

3. The method of claim 1 wherein said clinker is rapidly quenched from a temperature in the range of from about 2650° F. to about 2850° F.

4. The method of claim 1 wherein said quenching occurs at the rate of at least about 1.5 times the normal cooling rate.

5. The method of claim 1 wherein said clinker is quenched from said temperature of above about 2600° F. to a temperature of about 500° F. in less than about 10 minutes.

6. The cement composition produced by the method of claim 1.

7. The method of claim 1 wherein said metal oxide is an oxide of a metal selected from vanadium, zirconium, manganese and titanium.

8. The cement composition produced by the method of claim 7.

9. The method of claim 1 wherein said metal oxide is $TiO_2$.

10. The cement composition produced by the method of claim 9.

References Cited
UNITED STATES PATENTS

| 1,562,207 | 11/1925 | Croll | 106—102 |
|---|---|---|---|
| 3,667,976 | 6/1972 | Tanner | 106—101 |

JAMES E. POER, Primary Examiner